Jan. 30, 1962  S. F. JOHNSTON, JR  3,019,432
AIRCRAFT WITH SUPPORT FOR A PLURALITY OF
LUNEBERG REFLECTIVE LENSES
Filed March 23, 1960  4 Sheets-Sheet 4

INVENTOR.
SIDNEY F. JOHNSTON, JR.
BY
ATTORNEYS

United States Patent Office 3,019,432
Patented Jan. 30, 1962

3,019,432
AIRCRAFT WITH SUPPORT FOR A PLURALITY OF LUNEBERG REFLECTIVE LENSES
Sidney F. Johnston, Jr., Knoxville, Tenn., assignor to the United States of America as represented by the Secretary of the Air Force
Filed Mar. 23, 1960, Ser. No. 17,233
7 Claims. (Cl. 343—18)
(Granted under Title 35, U.S. Code (1952), sec. 266)

The invention described herein may be manufactured and used by or for the United States Government for governmental purposes without payment to me of any royalty thereon.

This invention relates to a radar reflective device for vehicles and more particularly a radar reflector support and reflectors for aircraft. More specifically, it comprises a support for a plurality of Luneberg radar reflective lenses for obtaining "all around" radar reflective coverage primarily for use with target aircraft and other vehicles for intensifying radar reflections of or from an aircraft, from a ground station, or vehicle irrespective of the relative positions of the aircraft or vehicle and the search radar station.

Still more specifically, an object of the invention comprises a combination of spherical Luneberg radar reflective lenses and a special support or holder for supporting a plurality of the Luneberg radar reflective lenses at opposite sides of the fuselage of the airplane with one lens at each side facing forwardly, a second lens at each side facing rearwardly and a third lens at each side facing outwardly away from each other normal to the facing directions of the other Luneberg lenses.

Another object of the invention therefore is the provision of a plurality of Luneberg spherical radar reflective lenses and a mounting therefor for mounting the same on an aircraft or other vehicle in which the spherical radar reflective lenses are mounted in longitudinal substantially horizontal alignment so that one Luneberg radar reflective lens covers substantially a forward hemisphere, a second similar lens covers a rearward hemisphere, and a third similar lens covers a hemisphere in a horizontal direction normal to the first and second hemispheres.

The Luneberg radar reflective lenses, as employed herein are conventional and no specific invention is asserted or claimed in or for the Luneberg radar reflective lenses themselves, but only in the combination and the mounting means. These Luneberg radar reflective lenses function quite similar to a conventional corner radar reflector and are more effective and efficient in reflecting radar waves or beams back to their source. The Luneberg radar reflective lenses contemplated herein comprise a spherical body having a front hemisphere and an adjoining rear hemisphere with an annular radial flange surrounding the periphery of the two hemispheres at the juncture thereof. Also the front hemisphere is or may be slightly smaller than the rear hemisphere. Radar waves striking and entering the front hemisphere from any radial direction are reflected by the internal construction and rear hemisphere in the same radial direction, to the radar sending or search or tracking station.

A further object is the provision of a Luneberg lens mounting means and Luneberg radar reflective lens members therein, adapted to be mounted on bomb rack pylons on opposite sides of the fuselage of a fighter aircraft for radar reflection and identification by radar from another aircraft, vehicle, or ground station for reception of intensified radar signals from the Luneberg radar reflective lenses.

Other objects and advantages of the invention will become apparent from the following description and accompanying drawings in which like reference characters refer to like parts in the several figures of the drawing.

Figure 1:
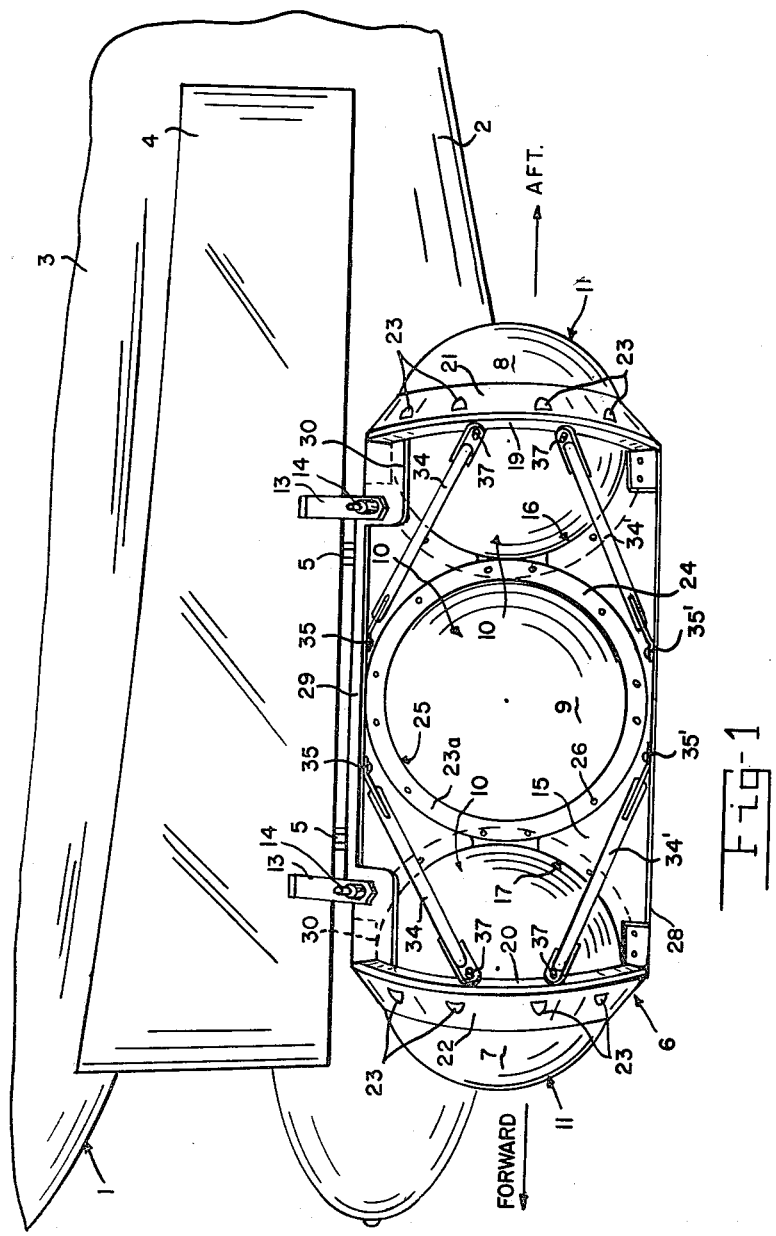
FIGURE 1 is a fragmentary side perspective view of the device in combination with a fighter aircraft.

In the drawings the reference numeral 1 denotes an aircraft or other vehicle. In the case of an aircraft the reference numeral 2 indicates the fuselage or body thereof having a supporting structure 3 therefor, such as wings projecting from either side of the body and bomb rack supporting pylons 4 depending from the under-side of each of the wings 3, the pylons 4 being provided with bomb rack shackles 5 from which the Luneberg radar reflective lens supporting structure forming an important part of the invention is supported, this structure being indicated generally at 6 and containing a plurality of conventional spherical Luneberg radar reflective lenses comprising, a forward facing lens 7, a rearwardly facing second lens 8 and a third or intermediate similar spherical Luneberg radar reflective lens 9 facing outwardly away from the fuselage 2 in a direction normal to the facing directions of the first and second Luneberg lenses 7 and 8.

Figure 2:
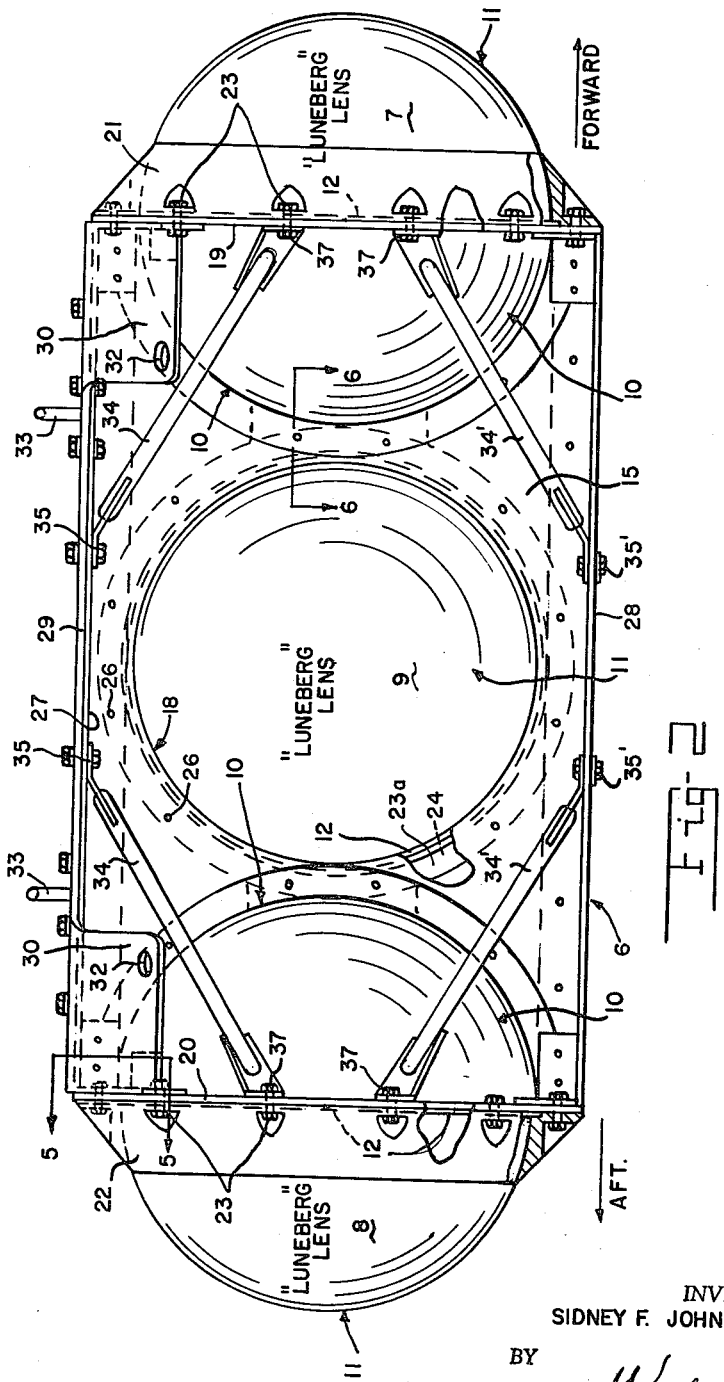
FIGURE 2 is an enlarged side elevation of the device which is mounted on the opposite side of the aircraft.
Figure 3:
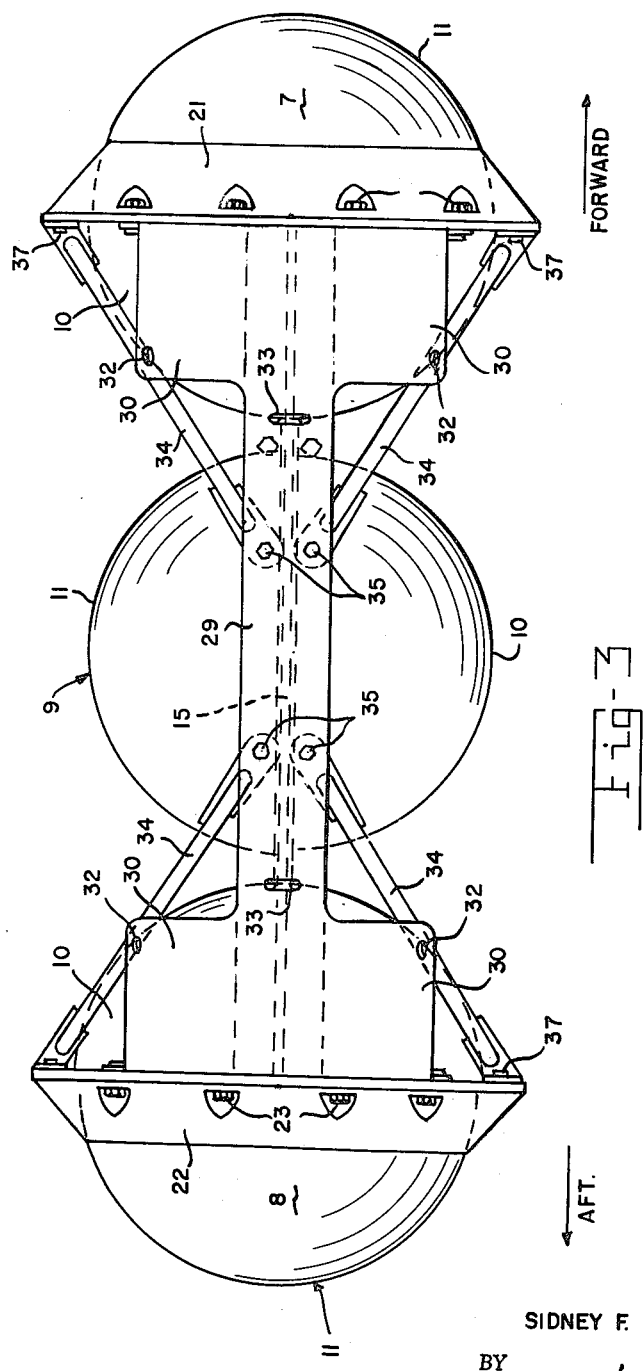
FIGURE 3 is a top plan view of the disclosure as shown in FIGURE 2.

The Luneberg lenses 7, 8 and 9 are all substantially identical and substantially spherical and comprise, as shown in FIGURE 2, a hemispherical rear portion 10, and an adjoining substantially hemispherical front portion 11 which may be slightly smaller in diameter than the rear hemispherical portion 10, the lenses each being provided with an annular radial flange 12 or rib around its periphery between the front and rear hemispherical portions 11 and 10.

Figure 4:
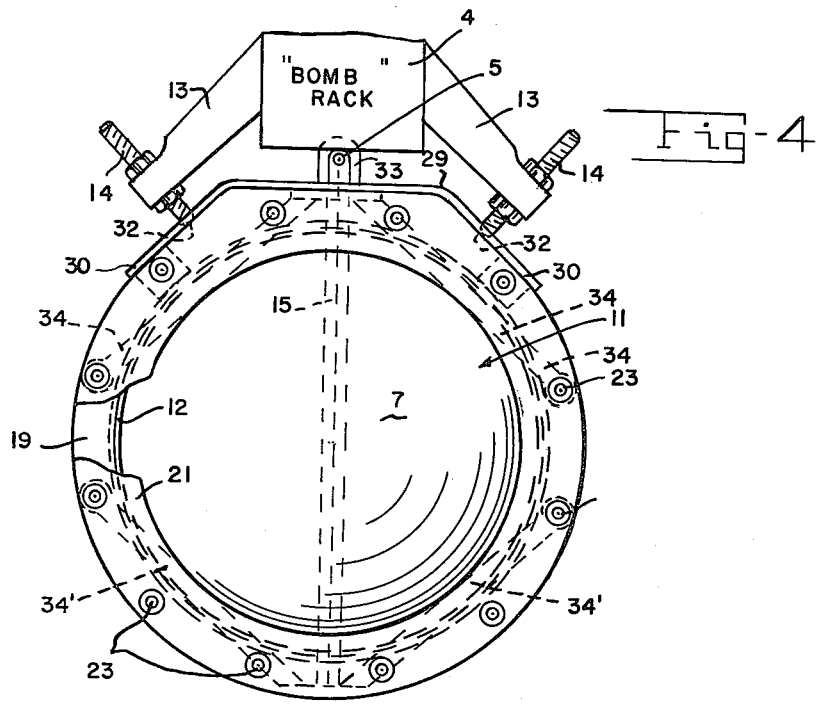
FIGURE 4 is an end view from the forward end, showing the mounting bomb rack pylon partly broken away.
Figure 5:
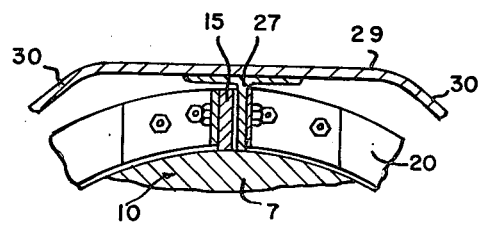
FIGURE 5 is a fragmentary sectional view taken about on the plane indicated by line 5—5 in FIGURE 2.
Figure 6:
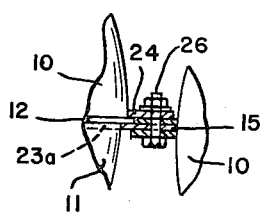
FIGURE 6 is a fragmentary sectional view taken about on the plane indicated by line 6—6 in FIGURE 2.

Referring more particularly to FIGURES 1 and 4 the bomb rack pylon 4 is provided with downwardly oppositely inclined flanges or arms 13 at its forward and rearweard ends, in which are threaded stabilizing jack or screws 14 for taking up play and stabilizing the Luneberg radar reflective lens mounts 6 against side sway during its operation in flight on the bomb rack pylons 4 of a high speed fighter aircraft 1.

The Luneberg radar reflective lens support 6 comprises an elongated flat supporting plate or panel 15 disposed in a vertical plane in the flight direction of the aircraft 1, the plate or panel 15 having semi-circular lens receiving recesses 16 and 17 formed therein for the reception of the rear larger hemispherical portions 10 of the spherical Luneberg radar reflective lenses 7 and 8. A third opening 18, circular in shape, is formed through the plate 15 intermediate the first and second semi-circular openings 16 and 17 in alignment, as shown, with the openings 16 and 17, for the reception of the rear hemispherical portion of the intermediate or third Luneberg radar reflective lens 9.

At the opposite ends of the vertical flat plate 15 are fixed annular fore and aft Luneberg radar reflective lens retaining rings or plates 19 and 20 which are disposed in vertical planes normal to the plane of the flat plate 15 and parallel to each other.

These rings or annular flanges 19 and 20 have spherical openings therethrough to receive the rear hemispherical portions of the lenses 7 and 8 therethrough with rear surfaces thereof seated in the semi-circular recesses 16 and 17, with the radial flanges 12 of the lenses 7 and 8 abutting or substantially abutting the outer surfaces of these rings 19 and 20. A pair of removable annular retainer members or rings 21 and 22 are provided, which are bolted or otherwise secured at 23 to the outer faces of the rings 19 and 20, the rings having circular openings therethrough to "just" receive the smaller hemispherical front portions 11 of lenses and are chamfered to receive the radial flanges 12 between the base of the flanges 19 and 20 and the rings 21 and 22, retaining the lenses securely in place in the semi-circular recesses 16 and 17 with their front surfaces facing outwardly in opposite directions in a horizontal or flight axis direction, and with the front hemispheres of the lenses extending outwardly beyond the opposite ends of the supporting flat plate 15.

Surrounding the intermediate circular opening 18 is an annular spacer ring 23a having an inner diameter to "just" receive the radial flange 12 of the intermediate or third Luneberg radar reflective lens 9 therethrough, the thickness of this spacer ring 23 being substantially the same or slightly greater than the thickness of the radial flange 12 around the third or intermediate Luneberg radar reflective lens 9.

An annular outer retainer plate or ring 24 having a circular opening 25 therethrough is provided with a diameter to "just" receive the smaller hemisphere 11 of the third Luneberg radar reflective lens 9 therethrough to retain the radial flange 12 against the outer face of the flat plate 15.

The retainer plate or ring 24 is secured by bolts or other securing means 26 to the outer surface of the elongated flat plate 15, retaining the third spherical Luneberg radar reflective lens 9 in position in longitudinal alignment between the two Luneberg lenses 7 and 8 with its front and rear surfaces projecting outwardly beyond the opposite sides of the flat plate 15.

The flat plate 15 is suitably reinforced along its top and bottom edges by the top "angle irons" 27 and bottom "angle irons" 28.

Secured to the upper surface of the top "angle iron" 27 is an elongated supporting plate 29 extending between the end flanges 19 and 20, the ends of which are outwardly and downwardly flanged at 30 and are provided with suitable depressions 32 for receiving the ends of the stabilizing jacks or screws 14.

Projecting from the upper surface of the plate 29 and firmly secured thereto are spaced supporting inverted U shackles 33 which extend upwardly into the bomb rack release devices in the bottoms of the pylon members 4.

The transverse annular end flanges or rings 19 and 20 are suitably and adequately braced by the diagonal brace means or members 34 secured at 35 to the upper intermedial portion of the flat plate structure and at their lower ends to the inner surfaces of the flange rings 19 and 20 at 37. A second set of diagonal brace rods 34' may also be provided, secured at 37' at their outer end to the outer faces of the flange rings 19 and 20 and at their lower inner ends at 35' to the lower portion of the flat plate structure.

It should be noted that the outer faces of the retainer rings 21 and 22 are conical, inclining inwardly to the outer or front surfaces 11 of the end or first and second Luneberg radar reflective lens reflectors 7 and 8.

When the Multi-Luneberg radar reflective lens reflector structure is suspended from the bomb racks on the pylons at opposite sides of the fuselage of a fighter aircraft, as contemplated, and employed as a radar target aircraft, all radar beams striking and entering any of the front surfaces 11 of any one or more of the Luneberg radar reflective lenses are reflected straight back to their source, such as an "attacking" aircraft or a ground range station, and therefore provide a relatively intensified radar screen image which will simulate the reflected radar image on the radar screen of a much larger normal target, such as a larger plane, for instance as a "heavy bomber." It should also be noted that the Luneberg radar reflective lenses are mounted in alignment with the longitudinal flight direction of the aircraft at each side thereof, thereby providing an all around coverage, two of the lenses facing forwardly, two facing rearwardly, and one at each side facing in opposite directions outwardly from each side of the aircraft normal to the facing directions of the other lenses.

By mounting the multiple Luneberg radar reflective lens structure, as shown and described, the same can easily and quickly be mounted on the bomb rack pylons of conventional fighter aircraft for practice and radar target purposes without any change or modification of the aircraft and they can be quickly and easily released and removed for the replacement of conventional fighter aircraft equipment such as bombs, rockets, etc. Operating the bomb racks' conventional release mechanism disengages the two supporting U shackles 33 and the multiple Luneberg radar reflective lens structure can be removed. They can also be dropped in flight, if an emergency requires it.

Removal of the Luneberg radar reflective lenses, or replacement, when necessary can be easily accomplished by first removing the securing means or threaded fasteners 23 and 26, after which the retainer rings 21, 22 and 24 are removed, thus freeing the radial flanges 12, after which the Luneberg radar reflectors can be removed and replaced. They can only be replaced in the correct facing manner since the inner or rear hemisphere is slightly larger than the front section and the retainer rings will not fit over the rear or larger hemispheres.

The "rear" surface or rear hemisphere of the spherical Luneberg lenses employed have a metallic inner reflecting surface for reflecting the radar waves entering the front face or surface and passing through the composition of the spherical lens structure back through the composition of the lens structure so that they leave the lens through the front surface in the precise opposite direction.

Although the invention herein shown and described is fully capable of achieving the objects and providing the advantages hereinbefore mentioned it is to be understood that it is merely the presented preferred embodiment of the invention and that I do not mean to be limited to the exact details of construction, other than as defined in the appended claims.

I claim:
1. A holder for supporting a plurality of spherical Luneberg radar reflective lenses each having a rear half and a front half facing in opposite directions comprising, an elongated supporting plate having a semi-circular recess in each end for the reception of substantially the rear half of a substantially spherical Luneberg radar reflective lens therein with the front half of the lens facing outwardly beyond the ends of said plate, said plate having a circular opening therethrough intermediate the semi-circular recesses for the reception of substantially the rear half of another substantially spherical Luneberg radar reflective lens therethrough with the front half facing outwardly away from the side of said plate, securing means removably secured to each of the ends of said plate for securing one spherical Luneberg radar reflective lens in each of said semi-circular recesses, retaining means removably secured to one side of said plate intermediate said semi-circular recesses for retaining a spherical Luneberg radar reflective lens in said circular opening with its front half facing outwardly away from the side of said plate, and supporting means fixed to the upper portion of said plate intermediate the end thereof for supporting said plate.

2. A holder for supporting a plurality of substantially identical spherical bodies in alignment comprising, an elongated flat plate having a semi-circular recess in each end for the reception of half of one of the spherical bodies therein with the remainder of the bodies in said semi-circular recesses projecting outwardly in opposite directions away from and beyond the opposite ends of said plate, said plate having a circular opening therethrough intermediate the adjacent bottoms of said semi-circular recesses for the reception of a third one of the substantially spherical bodies therein projecting outwardly beyond the opposite sides of said flat plate, annular retaining means secured to each end of said flat plate normal to the plane of the plate having a circular opening less in diameter than the maximum diameter of the spherical body for securing one of said spherical bodies in each of said semi-circular recesses, projecting through said opening away from the opposite ends of said flat plate, an annular retaining ring surrounding said circular opening having a circular opening therethrough less in diameter than the maximum diameter of the spherical bodies and secured to one side of said flat plate for retaining said third spherical body in said circular opening in said plate with the spherical body projecting beyond the opposite sides of said flat plate, and supporting means attached to the upper portion of said flat plate between the opposite ends thereof for suspending said plate from a support.

3. In combination with an aircraft having a support thereon, a multiple Luneberg lens mounting device suspended from said support comprising, an elongated flat plate suspended from said support parallel to the longitudinal axis of the aircraft in a fore and aft vertical plane, and a plurality of spherical Luneberg radar reflective lenses fixed in said plate in longitudinal alignment, one of said spherical Luneberg lenses positioned in the forward end of said plate facing forwardly, a second one of said spherical Luneberg lenses positioned in the rear end of said plate facing rearwardly, and a third one of said spherical Luneberg lenses positioned in said plate in substantial alignment with said first and second spherical Luneberg lenses and facing outwardly away from said plate in a direction normal to the facing directions of said first and second spherical Luneberg lenses.

4. A multiple Luneberg lens support, in combination with a plurality of spherical Luneberg radar reflective lenses therefor comprising, an elongated flat vertical supporting plate having a substantially semi-circular recess formed in each of its opposite ends each adapted to receive substantially half of one of said lenses, a first Luneberg radar reflective lens seated in one of said semi-circular recesses facing away from said plate in one direction parallel to the longitudinal direction of said plate, a second Luneberg radar reflective lens seated in the other semi-circular recess facing in the opposite direction parallel to the longitudinal axis of said plate, said plate having a circular opening extending therethrough intermediate the bottoms of said semi-circular recesses for receiving therein a third one of said Luneberg radar reflective lenses, a third spherical Luneberg lens disposed in said circular opening and projecting outwardly from the opposite sides of said plate normal to the plane of the plate and normal to the facing directions of the first and second Luneberg radar reflective lenses, circular first and second annular retainer rings secured to the opposite ends of the plate and surrounding said first and second Luneberg radar reflective lenses normal to the side of the plate, securing said first and second Luneberg radar reflective lenses in the semi-circular recesses, and a third annular retainer ring surrounding said circular opening and said third Luneberg radar reflective lens in a plane parallel to the plane of said plate and secured to the plate for retaining said third Luneberg radar reflective lens in said circular opening in said plate.

5. A multiple Luneberg radar reflective lens supporting structure and spherical Luneberg radar reflective lenses therefor as defined in claim 4 in which said first, second, and third spherical Luneberg radar reflective lenses are substantially identical and each has a front and a rear surface and a peripheral radial supporting flange projecting from its outer surface in a plane through its center between its front and rear surfaces, said peripheral flanges of said first and second Luneberg radar reflective lenses each being secured between each of the opposite ends of said plate and one of the said first and second annular retainer rings respectively for retaining said first and second Luneberg radar reflective lenses in said semi-circular recesses, said flange on said third Luneberg lens being secured between the side of said plate surrounding the circular opening and said third annular retainer ring for retaining the third Luneberg radar reflective lens in said circular opening.

6. In combination with an aircraft having a fuselage, wings extending from opposite sides of said fuselage, and bomb rack pylons depending from the under-side of the wings at opposite sides of the fuselage, a longitudinal support releasably fixed to each of said pylons extending in a direction substantially parallel to the longitudinal axis of the aircraft, a flat elongated supporting plate depending from said longitudinal support in a substantially vertical plane, a plurality of substantially spherical Luneberg radar reflective lenses, each lens having a substantially spherical body and an annular radial flange projecting from its periphery dividing the same into front and rear hemispherical portions, said flat plate having a semi-circular recess formed in each of its opposite ends opening outwardly away from the ends of said plate for receiving the rear hemispherical portions of a first and second one of said Luneberg lenses therein, said flat plate having a circular opening therethrough substantially midway between the bottoms of the two semi-circular recesses having a diameter receiving a third one of said Luneberg lenses therein with the radial flange thereof abutting the side of said plate, said flat plate having a circular end flange fixed thereon at each end normal to the plane of said plate and surrounding the semi-circular recesses, normal thereto, for abutting engagement with the radial flanges of said first and second Luneberg lenses disposed in said semi-circular recesses, a circular retaining ring removably secured to each of said circular end flanges having a circular opening therethrough receiving a hemispherical portion of said first and second one of Luneberg lenses therethrough, for retaining said flanges of said first and second Luneberg lenses in place between said circular retaining rings and said circular end flanges on the ends of said flat plate, an annular retaining plate removably fixed to the side of said flat plate surrounding said circular recess having a circular opening therethrough receiving a hemisphere of said third Luneberg lens therethrough retaining the annular flange thereof between said annular retaining plate and said flat plate, whereby the first and second Luneberg lenses are secured on said pylons at opposite sides of the fuselage of said aircraft facing forwardly and rearwardly relative to the direction of flight and a third Luneberg lens is secured to each of the pylons at opposite sides of the fuselage, facing in opposite directions normal to the facing directions of the first and second Luneberg lenses.

7. In combination, a vehicle, a plurality of substantially spherical Luneberg radar reflector lens means carried by said vehicle comprising, a first pair of said lenses facing forwardly, a second pair of said lenses facing rearwardly, and a third pair of said lenses facing outwardly in opposite directions normal to the facing directions of said first and second pairs of said lenses.

No references cited.